US007857153B2

(12) United States Patent
Ito et al.

(10) Patent No.: US 7,857,153 B2
(45) Date of Patent: Dec. 28, 2010

(54) ARTIFICIAL NIPPLE, INFANT FEEDING DEVICE, AND ARTIFICIAL NIPPLE MANUFACTURING METHOD

(75) Inventors: Kazumasa Ito, Tokyo (JP); Mitsuo Tashiro, Tokyo (JP); Norio Kimura, Tokyo (JP); Nobuyasu Endo, Fuji (JP)

(73) Assignee: Pigeon Corporation, Tokyo (JP)

( * ) Notice: Subject to any disclaimer, the term of this patent is extended or adjusted under 35 U.S.C. 154(b) by 750 days.

(21) Appl. No.: 11/572,526

(22) PCT Filed: Jul. 28, 2005

(86) PCT No.: PCT/JP2005/013876

§ 371 (c)(1),
(2), (4) Date: Mar. 30, 2007

(87) PCT Pub. No.: WO2006/011573

PCT Pub. Date: Feb. 2, 2006

(65) Prior Publication Data

US 2007/0272645 A1 Nov. 29, 2007

(30) Foreign Application Priority Data

Jul. 29, 2004 (JP) ............................ 2004-221931

(51) Int. Cl.
*A61J 11/00* (2006.01)
*A61J 11/04* (2006.01)
*B29C 45/00* (2006.01)

(52) U.S. Cl. ...................... 215/11.1; 264/510; 264/512; 264/513; 606/236

(58) Field of Classification Search ................ 215/11.1; 604/234; 606/234, 236; 264/510, 512, 513
See application file for complete search history.

(56) References Cited

U.S. PATENT DOCUMENTS 1,989,060 A * 1/1935 Liddick ..................... 215/11.1

(Continued)

FOREIGN PATENT DOCUMENTS

JP 213008 11/1927

(Continued)

OTHER PUBLICATIONS

International Search Report for PCT App. No. PCT/JP2005/013876 (Sep. 13, 2005).

*Primary Examiner*—Sue A Weaver
(74) *Attorney, Agent, or Firm*—Kenealy Vaidya LLP

(57) ABSTRACT

An artificial nipple can include a nipple body portion connected to a mounting structure that is configured for mounting the nipple on an infant feeding bottle. A mammary papilla leading end portion can be disposed at the leading end portion of a mammary papilla portion and have a leading end opening portion. The inner layer on the inner side of the wall is formed of a shape holding layer made of a material having a rigidity capable of holding the wall shape. The outer layer on the surface side of the wall is formed of a tongue abutting layer having a smooth face. Between the shape holding layer and the tongue abutting layer there is disposed a deformation absorbing layer which is made of a material having a lower rigidity than that of the material of the shape holding layer and the tongue abutting layer.

15 Claims, 8 Drawing Sheets

U.S. PATENT DOCUMENTS

| | | | | |
|---|---|---|---|---|
| 3,193,125 | A * | 7/1965 | Fischer | 215/11.1 |
| 3,500,831 | A * | 3/1970 | Schaar | 215/11.5 |
| 3,590,819 | A * | 7/1971 | Kraft | 215/11.4 |
| 5,544,766 | A * | 8/1996 | Dunn et al. | 215/11.1 |
| 2002/0030029 | A1* | 3/2002 | Hakim | 215/11.1 |

FOREIGN PATENT DOCUMENTS

| | | | |
|---|---|---|---|
| JP | 3615480 | | 6/1961 |
| JP | 36-29265 | | 11/1961 |
| JP | 88388/1979 | | 6/1979 |
| JP | 63-24948 | A | 2/1988 |
| JP | 2264660 | | 10/1990 |
| JP | 04-41864 | Y2 | 10/1992 |
| JP | 7130245 | | 5/1995 |
| JP | 2000-189496 | A | 7/2000 |
| JP | 2002011076 | | 1/2002 |

* cited by examiner

Fig. 7(a)
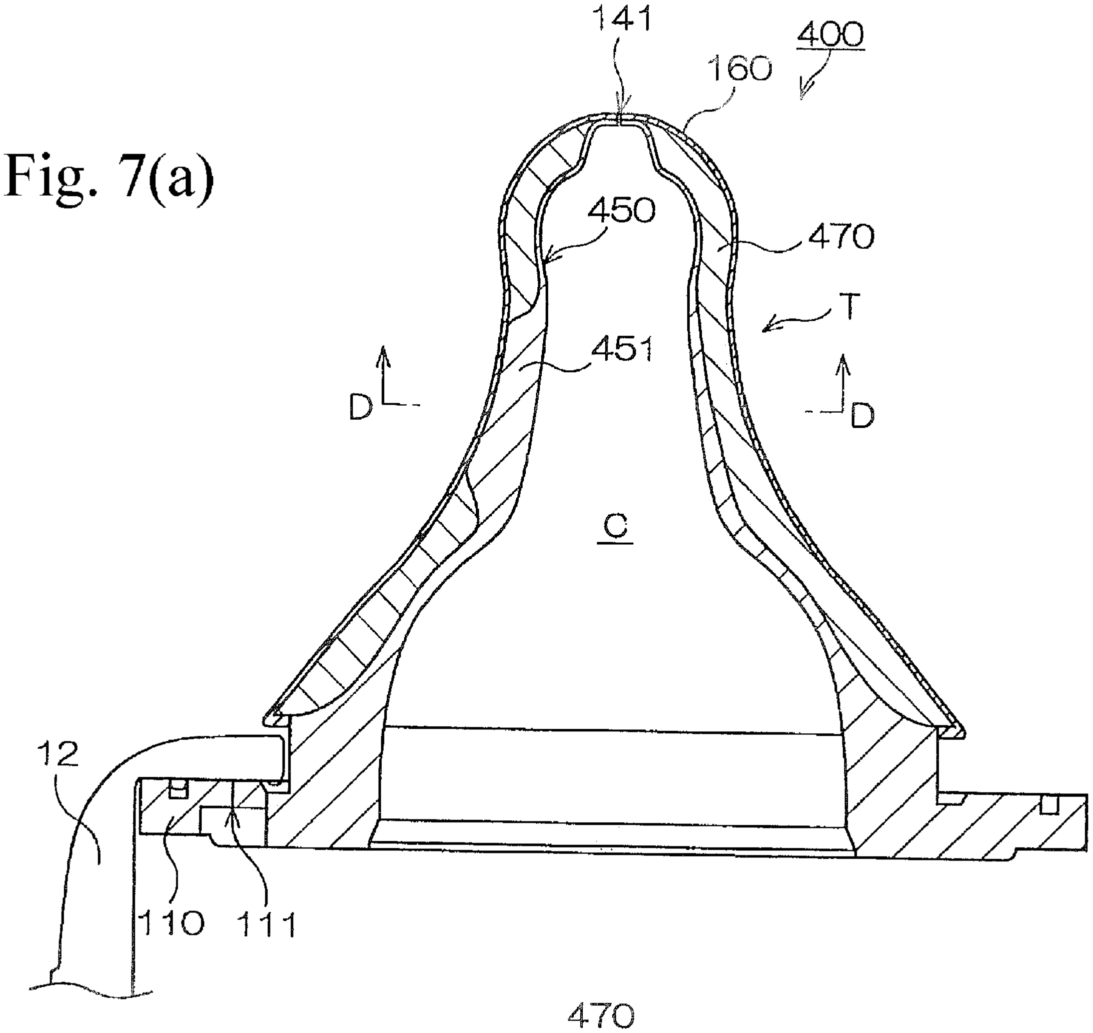
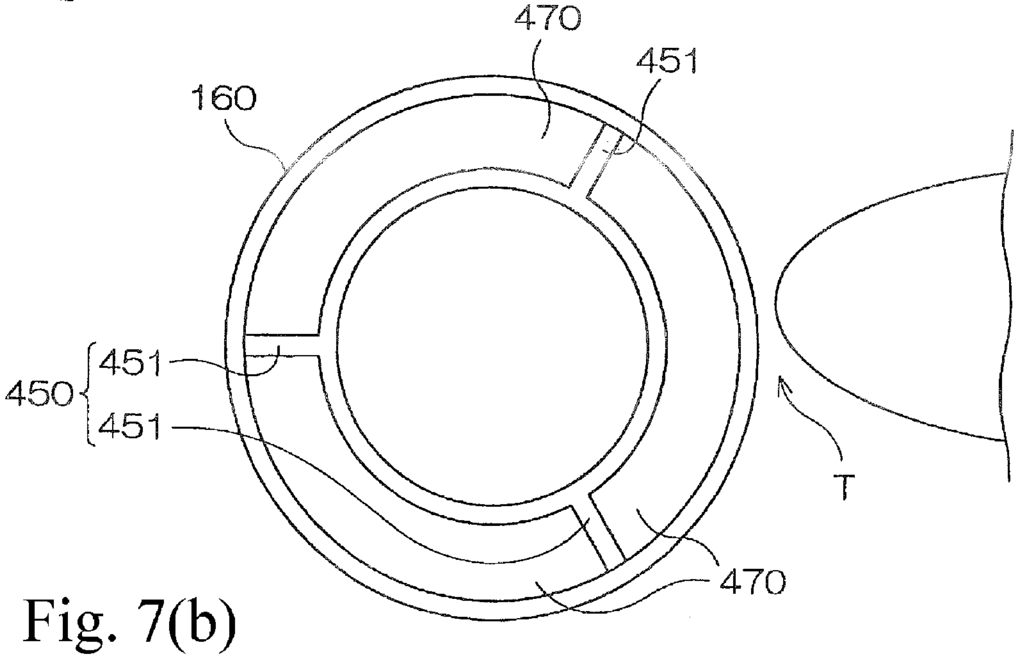
Fig. 7(b)

ARTIFICIAL NIPPLE, INFANT FEEDING DEVICE, AND ARTIFICIAL NIPPLE MANUFACTURING METHOD

This application is a National Stage application filed under 35 U.S.C. § 371 of PCT/JP2005/13876 filed on Jul. 28, 2005 which claims priority to Japanese Patent Application No. 2004-221931 filed on Jul. 29, 2004, which are both hereby incorporated in their entirety by reference.

BACKGROUND

1. Field

The present invention relates to an artificial nipple which is used, for example, at the time when an infant or the like is given the breast and/or an infant feeding device, and also relates to an artificial nipple manufacturing method.

2. Description of Conventional Art

An infant at an age for ingesting the milk of its mother may ingest not only the mother's milk but also the squeezed milk or artificially prepared milk. For this ingestion, an infant feeding bottle can be utilized for containing that prepared milk or the like.

This infant feeding bottle is provided with an artificial nipple for performing roles similar to those of the mother's nipple.

This artificial nipple is formed of silicone rubber or isoprene rubber into a hollow structure having a space formed therein for retaining a passage for the prepared milk.

On the other hand, the mother's nipple does not have a hollow structure but rather includes solid tissue.

It is known that the infant performs, when it ingests the mother's milk or the prepared milk, a tongue peristalsis motion, in which its tongue is waved in abutment against the nipple or the like.

This tongue peristalsis motion is described in the following. At first, the infant envelops the mother's nipple with its own tongue to bring the tip of the mother's nipple into a recess called the "infant feeding cavity" in its own mouth.

Next, as the infant stimulates the mother's nipple or the like with its tongue to promote the secretion of the mother's milk and to move the milk to the tip of the nipple, the infant's tongue begins to bulge from its leading end side so that the tongue bulge continuously moves toward the root side. This tongue motion is called the "tongue peristalsis motion".

By this movement or the tongue peristalsis motion of the bulge from the tongue leading end, the nipple is deformed and extended. Moreover, the nipple tip is formed from solid tissue, so that it is extended, while being slightly deformed and crushed, toward the leading end side.

Specifically, the infant moves its tongue bulge to suck the mother's milk to the leading side of the nipple. In the mouth, the closed space is formed by the nipple tip, the tongue bulge, the infant feeding cavity, the soft roof of mouth and so on.

This closed space is formed to increase its volume by the motion of the tongue so that it is evacuated to establish a negative pressure by the tongue motion. The nipple has its tip sucked into the closed space evacuated, so that the nipple is further deformed.

Next, the mother's milk thus secreted by the stimulation by the tongue peristalsis motion or by the accompanying negative pressure flows into the mouth of the infant. Then, the infant brings its tongue out of contact with the soft mouth roof thereby to open the closed space, and swallows the mother's milk. Thus, the infant ingests the mother's milk or the like.

The peristalsis motion by the infant's tongue is thus far described. However, the artificial nipple is hollow inside, but the mother's nipple is solid inside. Thus, when the infant performs this tongue peristalsis motion on the artificial nipple and the mother's nipple, these nipples are differently deformed.

When the infant performs the ingestion of the mother's milk by the mother's nipple and the ingestion of the prepared milk by the artificial nipple in parallel, the deformations of the nipples by the individual tongue peristalsis motions are different. As a result, the baby is confused in the peristalsis motions, and may receive the phenomenon called the "mammary papilla confusion", in which the baby cannot ingest the mother's milk well.

This phenomenon called the "mammary papilla confusion" is caused due to the aforementioned structural difference between the mother's nipple and the artificial nipple. In order to eliminate this difference, therefore, there have been proposed various artificial nipples, e.g., Patent Document 1, Patent Document 2, Patent Document 3, Patent Document 4 and Patent Document 5, where Patent Document 1: JP-A-2000-189496 (FIG. 1, etc.); Patent Document 2: JP-A-63-24948 (FIG. 1, etc.); Patent Document 3: JP-UM-B-36-15480 (Figure, etc.); Patent Document 4: JP-UM-B-4-41864 (FIG. 1, etc.); and Patent Document 5: JP-UM-B-36-29265 (Figure, etc.).

SUMMARY

If the artificial nipple disclosed in Patent Document 1 is made so soft that it can be deformed like the mother's nipple, the artificial nipple can be crushed to clog the inside hollow portion thereby causing a problem in that the prepared milk is hard to pass.

On the other hand, the artificial nipples of Patent Document 2 to Patent Document 5 have a problem in that the infant may find it hard to perform the aforementioned peristalsis motion.

If the artificial nipple deformed by the peristalsis motion of the infant tongue is to be formed, on the other hand, it is necessary to make the artificial nipple of a soft material. If made soft, however, the artificial nipple is crushed, and makes the prepared milk hard to pass. Moreover, since the surface of the artificial nipple is not smooth, it is hard to perform the tongue peristalsis motion.

Thus, according to an aspect of the invention an artificial nipple can be provided which has a smooth surface for easy peristalsis motion while being kept soft for the deformation of the peristalsis motion by the tongue, and which is so hard to crush as to feed the milk by the tongue peristalsis motion close to that at the mother's milk feeding time. The aspect can include an infant feeding device and an artificial nipple manufacturing method.

According to an exemplary embodiment of the invention, a tongue abutting layer having a smooth face allowing a peristalsis motion by a tongue is formed as an outer layer on the surface side of the wall of an artificial nipple formed from the nipple body portion to the mammary papilla leading end portion.

As a result, the nipple surface allows the infant or the like, when it is fed by the artificial nipple with the liquid in the infant feeding bottle, to easily perform peristalsis motion by tongue. When the infant or the like performs the peristalsis motion by tongue, more specifically, it forms a bulge (or bank) on the tongue leading end side, and moves the bulge toward the root side. In order to facilitate the movement of that tongue bulge, the smooth face capable of the peristalsis motion by the tongue is formed on the tongue abutting layer. As a result, the infant or the like can perform peristalsis motion easily by the tongue.

A shape holding layer made of a material having a rigidity to hold the shape of the wall is formed as an inner layer as the inner side of the wall of the artificial nipple. Moreover, a deformation absorbing layer made of a material having a lower rigidity than that of the material belonging to the shape holding layer and the tongue abutting layer and formed to have a thickness larger than that of the shape holding layer and the tongue abutting layer is arranged between the shape holding layer and the tongue abutting layer.

Even if the tongue abutting layer of the wall is deformed by the peristalsis motion of the infant or the like, therefore, this deformation is absorbed by the deformation absorbing layer, so that the tongue peristalsis motion like that at the feeding time of the solid mother's breast can be done while preventing the entire wall from being crushed. As a result, the characteristic of the prepared milk or the like being hard to pass the hollow portion in the artificial nipple can be prevented.

Moreover, the wall of the artificial nipple is made of a soft material, and the deformation absorbing layer softer than the remaining layers is disposed as the intermediate layer, so that the nipple wall is so soft as can be deformed by the peristalsis motion of the tongue of the infant or the like. As a result, the infant or the like can perform the peristalsis motion by the tongue, as for the mother's nipple at the feeding time of the mother's milk.

On the other hand, the material of the low rigidity contained in the deformation absorbing layer is soft and easily deformable so that it has been noted as a material to be deformed in response to the peristalsis motion of the tongue. As the soft material becomes softer, however, its surface is so viscous that the infant finds it hard to perform the peristalsis motion directly by the tongue. When the artificial nipple is deformed, the inner faces may stick to each other thereby blocking the passage of the prepared milk or the like.

The fully deformable and soft material is used as the deformation absorbing layer. On the surface side, there is arranged a tongue abutting layer, which is made of a material more rigid than the deformation absorbing layer and which has a smooth face to allow the peristalsis motion by the tongue. On the inner side, there is arranged the shape holding layer having rigidity. As a result, it is possible to realize an artificial nipple that is similar to the mother's nipple, which is easy for conducting peristalsis motion by the tongue of the infant or the like, which holds its shape so that the inner layer may not be crushed while preventing the stick even with a contact and which can be easily deformed by the peristalsis motion.

Furthermore, the shape holding layer and/or the tongue abutting layer that is more rigid than the deformation absorbing layer are stretched to form a mounting structure or mounting means. As a result, the rigidity of the mounting means is so enhanced that it can be prevented in advance from being deformed or from unintentionally coming out of the infant feeding bottle.

In another embodiment, the mammary papilla leading end portion side having the leading end opening formed therein is formed exclusively of the shape holding layer and/or the tongue abutting layer.

The soft material to be used as the deformation absorbing layer has a relatively high viscosity. In case the deformation absorbing layer is arranged in the mammary papilla leading end portion, the outflow of the prepared milk or the like from the leading end opening may be reluctant. By forming the mammary papilla leading end portion of the shape holding layer and/or the tongue abutting layer, the outflow can be ensured even with the constitution, which makes it easy to perform the peristalsis motion of the tongue on the wall.

In another embodiment, the shape holding layer on the side of the mammary papilla leading end portion is thinner than the shape holding layer on the side of the mammary papilla portion and the nipple body portion.

In case the infant or the like performs the peristalsis motion with its tongue, the bulge (or bank) of the tongue is usually moved along the artificial nipple. Specifically, the tongue bulge moves from the side of the mammary papilla portion and the nipple body portion to the mammary papilla leading end portion and finally passes the nipple leading end portion so that it contacts with the soft roof of mouth in the mouth of the infant or the like.

This makes it advantageous for the tongue bulge of the infant or the like to greatly deform the nipple leading end portion of the artificial nipple. However, the above-described nipple constitution has a small thickness of the shape holding layer on the side of the mammary papilla leading end portion so that the tongue bulge of the infant or the like can easily move while deforming the mammary papilla leading end portion. As a result, the constitution allows the infant or the like to easily perform tongue peristalsis motion.

Moreover, the shape holding layer on the side of the mammary papilla portion and the nipple body portion is made thicker than that on the side of the mammary papilla leading end portion. As a result, the side of the mammary papilla portion and the nipple body portion are prevented from being crushed so that the passage of the prepared milk or the like is not clogged.

In another embodiment, the artificial nipple is constituted such that the shape holding layer is made thicker than the tongue abutting layer, and such that the deformation absorbing layer is made thicker than the shape holding layer.

Specifically, the tongue abutting layer of this claim is made of a relatively rigid material, and is given the least thickness for exhibiting the function to smoothen the tongue peristalsis motion by the infant or the like. Moreover, the deformation absorbing layer is made of a relatively less rigid material, and is given the largest thickness for absorbing the bulk movement accompanying the tongue peristalsis motion thereby to smoothen the movement.

Moreover, the shape holding layer is made of the relatively rigid material, but is made more rigid than the tongue abutting layer, thicker than the tongue abutting layer, and thinner than the deformation absorbing layer so as to prevent the crush of the artificial nipple by the tongue peristalsis motion.

In yet another embodiment, the artificial nipple is constituted such that the shape holding layer has a rigid portion protruding in the direction to leave the shape holding layer. As a result, it is possible to prevent the crush of the artificial nipple reliably while keeping the function to perform the tongue peristalsis motion of the infant or the like smoothly.

In still another embodiment, the artificial nipple is constituted such that the tongue abutting layer and the shape holding layer are made of an elastic body having a hardness of 15 to 50 degrees, and such that the deformation absorbing layer is made of an elastic member having the hardness of 10 degrees or less. This constitution can prevent the inner wall from being crushed, while keeping the smooth tongue motion, and can perform the tongue peristalsis motion like that at the breast feeding time. Here, each hardness indicates the value by the A-type duro-meter in JIS-K6235 (ISO7619).

According to an embodiment of the disclosed method for manufacturing the artificial nipple can include: the first molding step of injection molding an elastic material into either a shape holding layer shaping mold to shape the shape holding layer or a tongue abutting layer shaping mold to shape the tongue abutting layer, thereby to mold the shape holding layer or the tongue abutting layer; the second molding step of injecting molding an elastic material, while the shape holding layer or the tongue abutting layer being mounted, into a deformation absorbing layer shaping mold to shape the deformation absorbing layer, thereby to mold the deformation absorbing layer integrated with the shape holding layer or the tongue abutting layer; and the third molding step of molding the shape holding layer or the tongue abutting layer not molded, integrally with the deformation absorbing layer molded at the second molding step.

Therefore, the deformation absorbing layer can be reliably arranged between the tongue abutting layer and the shape holding layer. It is possible to manufacture such an artificial nipple that is similar to a mother's nipple simply and reliably and which can easily perform the peristalsis motion by the tongue of the infant or the like and which can be easily deformed by the peristalsis motion.

Another embodiment of a method for manufacturing the artificial nipple can include: the tongue abutting layer molding step of filling a tongue abutting layer shaping female mold with a liquid elastomer for a tongue abutting layer of a higher hardness, and subsequently inserting a tongue abutting layer shaping male mold into the tongue abutting layer shaping female mold, thereby compression molding the tongue abutting layer; the deformation absorbing layer molding step of filling the tongue abutting layer molded at the tongue abutting layer molding step, with a liquid elastomer for a deformation absorbing layer of a lower hardness, and subsequently inserting a deformation absorbing layer shaping male mold, thereby compression molding the deformation absorbing layer; and the shape holding layer molding step of filling the deformation absorbing layer molded at the deformation absorbing layer molding step, with a liquid elastomer for a shape holding layer of a higher hardness, and subsequently inserting a shape holding layer shaping male mold, thereby compression molding the shape holding layer.

According to an alternative embodiment, the deformation absorbing layer and the shape holding layer are molded, by compression molding, toward the inner side from the tongue abutting layer or the outer layer of the artificial nipple. When the less rigid deformation absorbing layer is injection-molded between the more rigid layers of the tongue abutting layer and the shape holding layer, there may arise problems that the injected resin is offset to one side, and that a homogenous layer is made hard to form by the influence of the injection pressure.

However, the less rigid deformation absorbing layer is formed by compression molding so that the homogeneous layer can be easily molded without any downward offset of the resin.

Since the artificial nipple is molded from the outer layer, moreover, it is sufficient to prepare only the female mold matching the tongue abutting layer or the outermost layer. Another female mold for the deformation absorbing layer or the shape holding layer need not be prepared so that the manufacture cost can be reduced.

The disclosed artificial nipple can have a smooth surface for easy peristalsis motion while being kept soft for the deformation of the peristalsis motion by the tongue, and which is hard to crush so as to feed the milk by the tongue peristalsis motion in a manner similar to that of the mother's milk feeding time. The invention can also include an infant feeding device and an artificial nipple manufacturing method.

BRIEF DESCRIPTION OF THE DRAWINGS

FIG. 7(*a*) is a schematic section showing an artificial nipple according to still another embodiment of the invention, and FIG. 7(*b*) is a schematic section along line D-D of FIG. 7(*a*).

DESCRIPTION OF EXEMPLARY EMBODIMENTS

Exemplary modes and embodiments of this invention are described in detail below with reference to the accompanying drawings.

Here, the modes and embodiments to be described in the following are specific examples of the invention so that technical features are associated therewith. However, the scope of the invention should not be limited to those exemplary modes.

Figure 1:
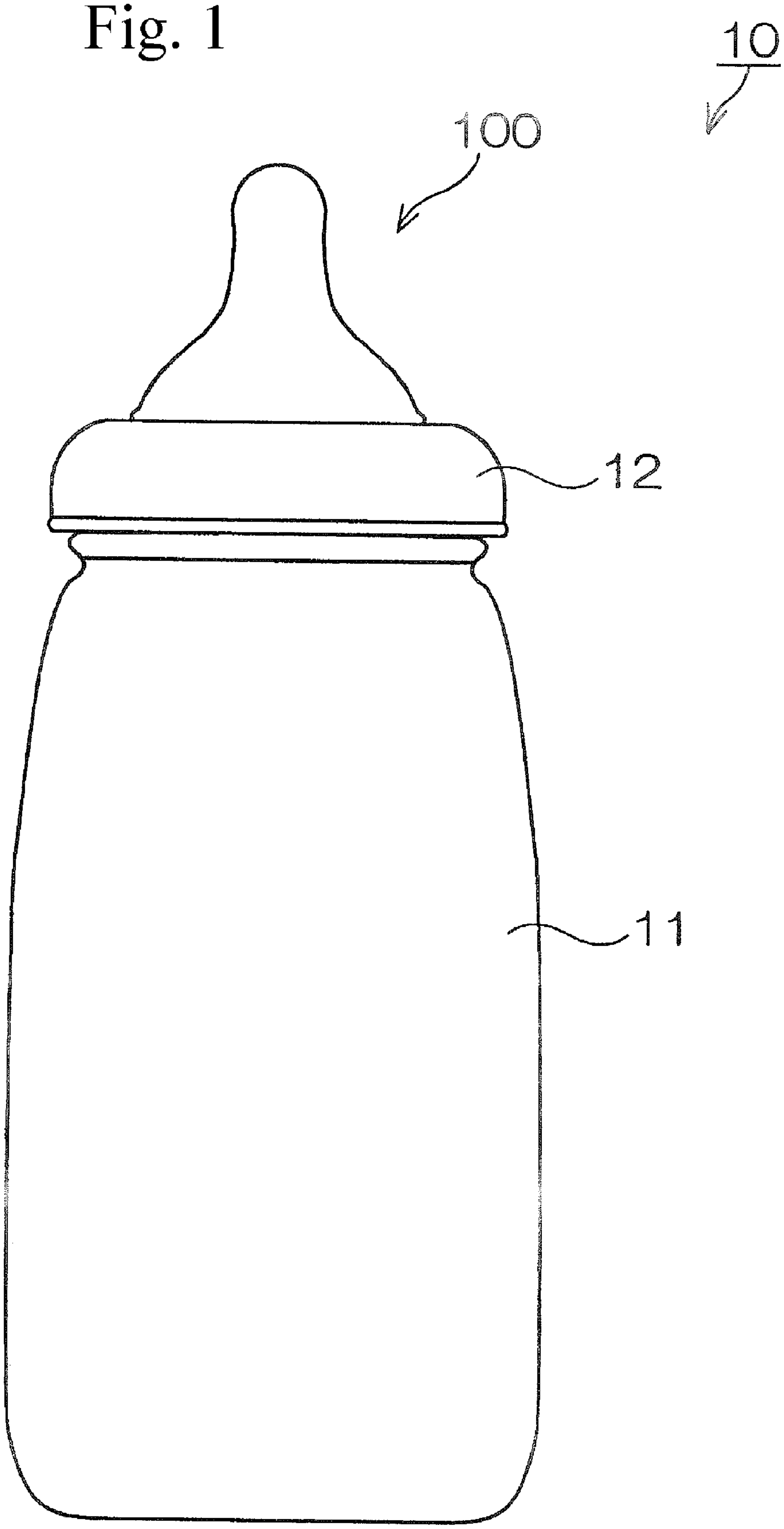
FIG. 1 is a schematic view showing a constitution of an infant feeding device according to an embodiment of the invention.

FIG. 1 is a schematic view showing a constitution of an infant feeding device 10 according to an embodiment of the invention. As shown in FIG. 1, the infant feeding device 10 includes an infant feeding bottle 11 made of glass or resin for containing a liquid such as prepared milk. The infant feeding device 10 is provided with an artificial nipple 100 made of a material such as silicone rubber. The infant feeding device 10 is further provided with a cap 12 made of a resin for fixing the artificial nipple 100 on the infant feeding bottle 11.

Figure 2:
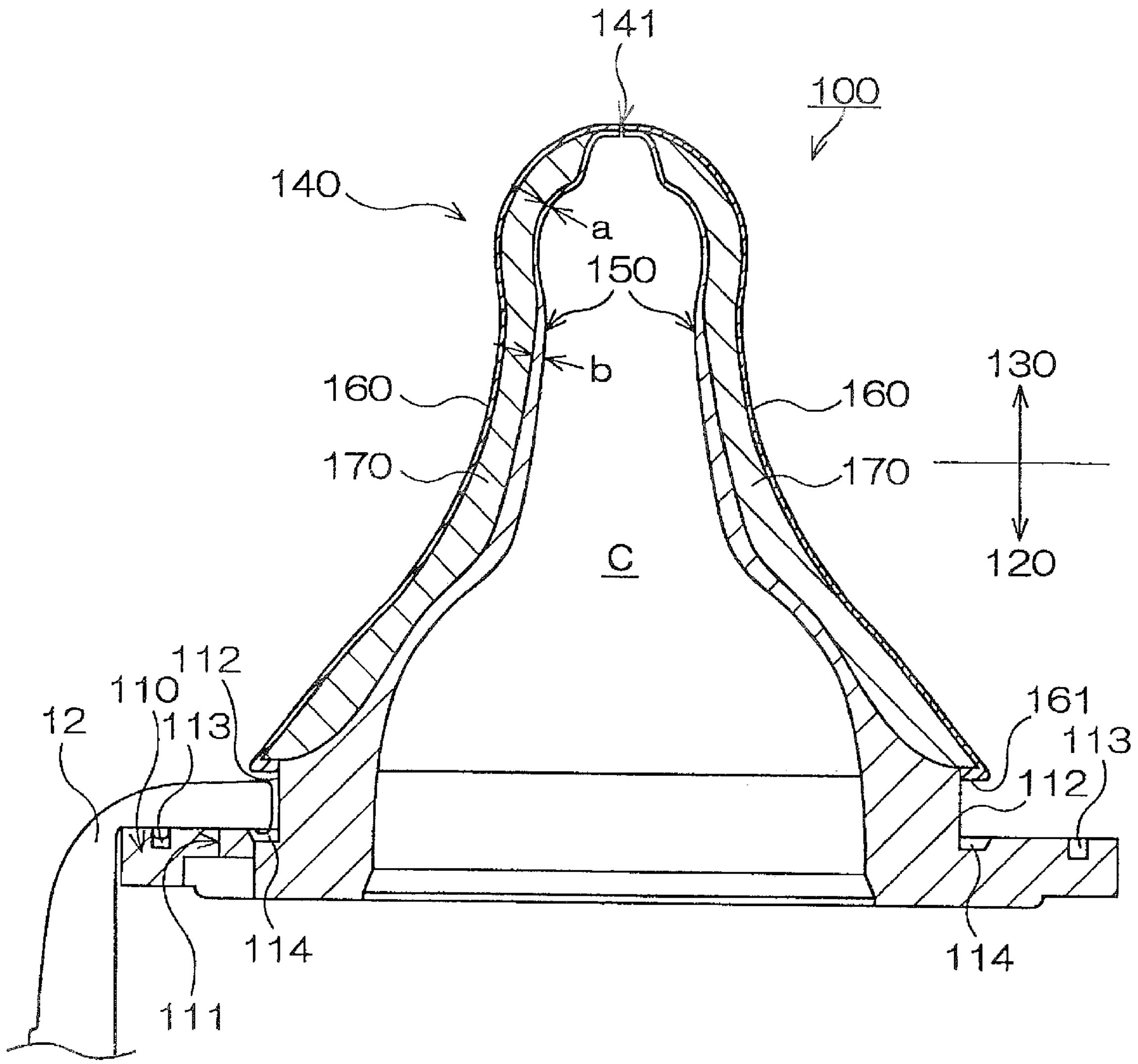
FIG. 2 is a schematic section showing a constitution of the artificial nipple of FIG. 1.

FIG. 2 is a schematic section showing a constitution of the artificial nipple 100 of FIG. 1. As shown in FIG. 2, the artificial nipple 100 is provided with a mounting structure or mounting means such as a base portion 110 for being removably mounted on the infant feeding bottle 11 by the cap 12 or the like.

The artificial nipple 100 is further provided with a nipple body portion 120 connected to the base portion 110, and a mammary papilla portion 130 protruded from the nipple body portion 120.

The mammary papilla portion 130 is provided at its leading end portion with a mammary papilla leading end portion 140. This mammary papilla leading end portion 140 is provided at its leading end with a leading end opening 141, as shown in FIG. 2. This leading end opening 141 is an opening for passing therethrough a liquid to be drunk by an infant, such as the prepared milk in the infant feeding bottle 11 of FIG. 1.

This leading end opening 141 is formed, as seen in the top plan view of FIG. 2, into one or more small openings of a round hole, or slits of cross, Y or straight shape.

The leading end opening 141 has communication with a hollow portion C formed in the artificial nipple 100. Moreover, the hollow portion C has communication with not only the leading end opening 141 but also the inside of the infant feeding bottle 11 so that the prepared milk or the like in the infant feeding bottle 11 can be fed from the leading end opening 141 through the hollow portion C.

The wall of the artificial nipple 100 of FIG. 2, as formed from the nipple body portion 120 to the mammary papilla leading end portion 140, is made of a soft material such as silicone rubber. In this embodiment, the soft material should not be limited to the silicone rubber but may also be exemplified solely or in combination by isoprene rubber, a thermoplastic elastomer such as polypropylene, or natural rubber.

On the inner side (as an inner layer) or on the wall of the artificial nipple 100 on the side of the hollow portion C, there is arranged a shape holding layer 150, which is made of a material having a rigidity capable of holding the shape of the wall of the artificial nipple 100. The shape holding layer 150 is formed of silicone rubber or the like having a hardness of 15 to 50 degrees (hardness by the A-type duro-meter in JIS-K6235 (IS07619)) or preferably 15 to 40 degrees.

In the peristalsis motion by the tongue of an infant, as described hereinbefore, it is desired that the wall of the artificial nipple is deformed into the hollow portion C of FIG. 2.

If, however, the artificial nipple has its wall so excessively deformed that it is crushed, the wall clogs the hollow portion C of FIG. 2. This raises a problem that the infant or the like cannot drink the prepared milk from the leading end opening 141.

However, the shape holding layer 150 of the artificial nipple 100 of this embodiment is made to have a relatively high hardness of 15 to 50 degrees so that the wall of the artificial nipple 100 can be prevented from being excessively deformed thereby to prevent the hollow portion C from being clogged.

At the outer layer on the surface side of the wall of the artificial nipple 100, on the other hand, there is formed a tongue abutting layer 160, which has a smooth face which allows the infant or the like to perform the peristalsis motion by its tongue, as shown in FIG. 2.

The tongue abutting layer 160 is formed of silicone rubber of a hardness of 15 to 50 degrees, for example.

The silicon rubber or the like has such properties that its surface smoothness is deteriorated as the hardness becomes lower (or softer). In order to raise the hardness of the silicon rubber, specifically, the silicone rubber is treated by adding a reinforcing agent to the base compound or the basic portion of the silicon rubber. In order to lower the hardness, on the other hand, the treatment is performed by reducing the reinforcing agent. When the hardness of the silicone rubber is lowered, therefore, the quantity of the reinforcing agent is so small that the silicone oil component of the base compound becomes liable to appear to the surface. Moreover, this silicone oil makes the surface of the silicone rubber sticky.

In this respect, the tongue abutting layer 160 of FIG. 2 is set to have a relatively high hardness of 15 to 50 degrees, so that the silicone oil hardly oozes to the surface of the silicone rubber forming the tongue abutting layer 160. As a result, the surface of the tongue abutting layer 160 is less viscous but smooth.

When the infant or the like drinks the prepared milk in the infant feeding bottle 11, as described above, the infant takes the artificial nipple 100 and performs the feeding motion with its tongue. Specifically, the infant moves its tongue bulge (bank) from the nipple body portion 120 of the artificial nipple 100 to the side of the mammary papilla leading end portion 140.

If the wall of the artificial nipple that abuts against the tongue is more viscous than necessary, the infant or the like cannot move the tongue bulge as smoothly as that which might occur when fed with the breast milk.

However, the tongue abutting layer 160 of this embodiment has a smooth surface of little viscosity on the surface so that the infant or the like can move its tongue bulge smoothly from the nipple body portion 120 of the artificial nipple 100 to the mammary papilla leading end portion 140. In short, the tongue abutting layer 160 enables the infant or the like to perform the tongue peristalsis motion easily.

If the tongue abutting layer 160 is made of a silicone rubber having an excessively high hardness, the tongue abutting layer is not deformed even by the tongue peristalsis motion of the infant or the like. As a result, it becomes hard to perform the peristalsis motion smoothly and it may cause mammary papilla confusion.

In this respect, the hardness of the silicone rubber of the tongue abutting layer 160 of the artificial nipple 100 of this embodiment is set within such a range as is deformed by the peristalsis motion of the tongue. Therefore, the infant or the like can perform the peristalsis motion smoothly by the tongue to avoid confusion.

Between the shape holding layer 150 and the tongue abutting layer 160, as shown in FIG. 2, there is sandwiched a deformation absorbing layer 170. As shown in FIG. 2, the deformation absorbing layer 170 is made of a material that is less rigid than that of the materials forming the shape holding layer 150 and the tongue abutting layer 160 and is made of an intermediate layer thicker than those of the remaining layers. For example, the deformation absorbing layer 170 is formed of silicone rubber having 10 degrees or less in the aforementioned hardness, i.e., a hardness of 0 to 10 degrees, or preferably 5 to 10 degrees.

In a case, therefore, when the bulge of the tongue accompanying the peristalsis motion of the tongue by the infant or the like is moved, if the tongue abutting layer 160 of the artificial nipple 100 deforms largely toward the hollow potion C, this large deformation is absorbed by the deformation absorbing layer 170. As a result, the inside shape holding layer 150 is not greatly deformed into the side of the hollow portion C.

As a result, a peristalsis motion of the tongue that is similar to the motion in which the infant or the like is fed with the breast milk, can be easily done. Moreover, the wall of the artificial nipple 100 can be prevented in advance from being crushed to clog the hollow portion C and prevent the prepared milk hard from passing through the artificial nipple 100.

Thus, the wall of the artificial nipple 100 can have a three-layered structure so that it can perform the peristalsis motion like that of the tongue, which is similar to that done by the infant or the like with the nipple of the mother.

As shown in FIG. 2, the portion, as indicated by arrow a, of the thickness of the shape holding layer 150 of the mammary papilla leading end portion 140 is made slightly thinner than the thickness, as indicated by arrow b, of the shape holding layer 150 of the mammary papilla portion 130 and the nipple body portion 120.

When the infant or the like performs the peristalsis motion of the tongue, the tongue bulge moves along from the nipple body potion 120 to the mammary papilla potion 130 and the mammary papilla leading end potion 140 of the artificial nipple 100. Finally, the tongue bulge abuts the soft roof of mouth after crossing the mammary papilla leading end potion 140.

On the other hand, the mammary papilla leading end portion 140 is formed, as shown in FIG. 2, into such an approximately spherical shape as is rounded in its entirety like the mammary papilla of the mother so that it is accommodated in the infant feeding cavity of the infant. However, this spherical shape is hard to deform. In the case, therefore, in which the approximately spherical portion is made hard, the tongue bulge having come from the nipple body portion 120 abuts against that spherical mammary papilla leading end portion 140. The same tongue feeding motion as described with respect to the preceding case cannot deform the mammary papilla leading end portion 140. This may disable the infant to perform the tongue peristalsis motion smoothly or to move the tongue in a way that is unlike that when the infant is fed by breast milk.

In this embodiment, therefore, the rigidity of the mammary papilla leading end portion 140, as made of a harder material, is lowered, and the thickness a of the shape holding layer 150 in the mammary papilla leading end portion 140 is made so small that the mammary papilla leading end portion 140 may be easily deformed.

Here, the thickness b of the shape holding layer 150, as formed in the mammary papilla portion 130 and the nipple body portion 120, is made relatively large. Even if, therefore, the wall of the artificial nipple 100 is deformed by the tongue peristalsis motion of the infant or the like, the constitution is made to hold such a shape as to prevent the artificial nipple 100 from being crushed to clog the hollow portion C.

In the nipple body portion 120 or the like, as shown in FIG. 2, the shape holding layer 150 is made slightly thicker than the tongue abutting layer 160, and the deformation absorbing layer 170 is made thicker than the shape holding layer 150.

The tongue abutting layer 160 is made of the silicone rubber having a relatively higher rigidity, as described hereinbefore. If the tongue abutting layer 160 is made thick, it is hard to deform by the tongue peristalsis motion. Therefore, the tongue abutting layer 160 is made the thinnest for exhibiting the function to smoothen the tongue peristalsis motion by the infant or the like.

On the other hand, the deformation absorbing layer 170 is made of a material having relatively low rigidity, and made to have the largest thickness. Therefore, the deformation absorbing layer 170 is constituted to absorb the bulge of the tongue, not to prevent the tongue peristalsis motion.

The shape holding layer 150 is made of the relatively rigid silicone rubber or the like and made thicker than the tongue abutting layer 160 so as to prevent the wall of the artificial nipple 100 from being crushed. Moreover, the shape holding layer 150 is provided on its outer side with the deformation absorbing layer 170. Therefore, when the shape holding layer 150 is made thicker than the tongue abutting layer 160 so as to hold the shape, it does not obstruct the deformation of the wall of the artificial nipple 100 due to the tongue peristalsis motion of the infant or the like.

As shown in FIG. 2, only the shape holding layer 150 and the tongue abutting layer 160 are arranged in the leading end opening 141 (not the deformation absorbing layer 170). If the deformation absorbing layer 170 were to exist in a case in which the leading end opening 141 has the slit shape, for example, the right and left deformation absorbing layers 170 would clog the slit when they abut against each other, so that the prepared milk or the like would hardly come out of the leading end opening 141, because the silicone rubber of the deformation absorbing layers 170 have the low hardness and the high viscosity.

In this embodiment, therefore, the mammary papilla leading end potion 140 has a shape holding layer 150 that is recessed to the side of the tongue abutting layer 160 to form the spherical shape, and is arranged in the abutting area. The deformation absorbing layer 170 encircles the outer circumference of the leading end opening 141 in the mammary papilla leading end portion 140. By fusing the shape holding layer 150 and the tongue abutting layer 160 directly, the silicone rubber of the deformation absorbing layer 170, as arranged and clamped between the shape holding layer 150 and the tongue abutting layer 160, can be prevented in advance from leaking out of the leading end opening 141.

As shown in FIG. 2, the base portion 110 is formed by stretching the shape holding layer 150 so that the base potion 110 is constituted to have the same hardness as that of the shape holding layer 150.

The shape holding layer 150 is set to have the relatively high hardness, as described above, so that the hardness of the base portion 110 is also relatively high. As a result, the base portion 110 is prevented from being deformed and disconnected from the cap 12, according to the feeding motion. Then, the artificial nipple 100 can be prevented in advance from unintentionally coming out from the infant feeding bottle 11.

Here in this embodiment, the base portion 110 is formed by stretching the shape holding layer 150, but may also be formed by stretching the tongue abutting layer 160. Alternatively, the base portion 110 may also be formed by stretching both the shape holding layer 150 and the tongue abutting layer 160.

Moreover, an engaging portion 112, as positioned on the base portion 110, is formed of the shape holding layer 150 thereby to hold the cap 12 reliably. At the same time, the engaging portion 112 is brought, at the end portion of a position 161, where the tongue abutting layer 160 is folded back to the side of the engaging portion 112, into abutment against and is integrally jointed to the engaging portion 112 of the shape holding layer 150. As a result, the shape holding layer 150 and the tongue abutting layer 160 are reliably fused to each other without exposing the deformation absorbing layer 170 to the outside. Here, this fusion may be more intensified by forming an engaging recess in the shape holding layer 150 so that the tongue abutting layer 160 may be inserted into that engaging recess.

Other constitutions of the above described exemplary embodiment will be described below.

Since the base portion 110 is provided with a vent valve 111, as shown in FIG. 2, the ambient air is passed, even in case the pressure in the infant feeding bottle 11 drops as the infant is fed with the milk, through that vent valve 111 into the infant feeding bottle 11 inside of the artificial nipple 100 thereby to prevent the buildup of a vacuum.

In short, the vent valve 111 has a function to provide communication between the inside and outside of the artificial nipple 100 attached to the infant feeding bottle 11 thereby to make the pressure equivalent.

On the other hand, the cap 12 is so mounted as to engage with the engaging portions 112 to 114, as disposed in the base portion 110 of the artificial nipple 100, and is screwed or otherwise attached to the infant feeding bottle 11. As shown in FIG. 2, more specifically, the cap 12 can fix the base portion 110 of the artificial nipple 100 on the infant feeding bottle 11 and can adjust the fastening strength and accordingly the air ventilation by the vent valve 111. Here, the vent valve 111 should not be limited to one but may also be disposed at a plurality of positions of the base portion 110 or may adopt another constitution.

An exemplary method for manufacturing artificial nipple 100 will be described below.

The artificial nipple 100 according to this embodiment is so constituted as described hereinbefore. The method for manufacturing the artificial nipple is described in the following.

Figure 3:
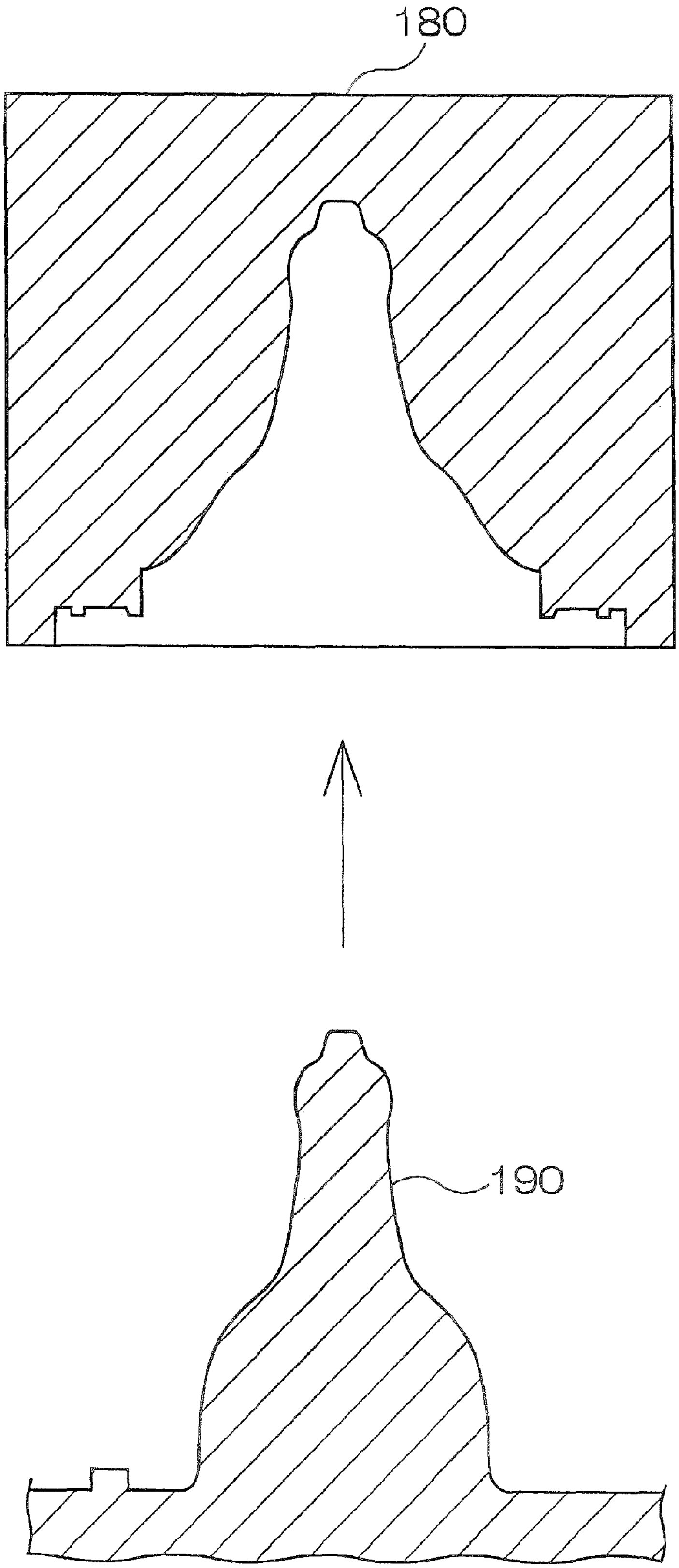
FIG. 3 is a schematic explanatory view showing molds for molding an artificial nipple in accordance with principles of the invention.
Figure 4:
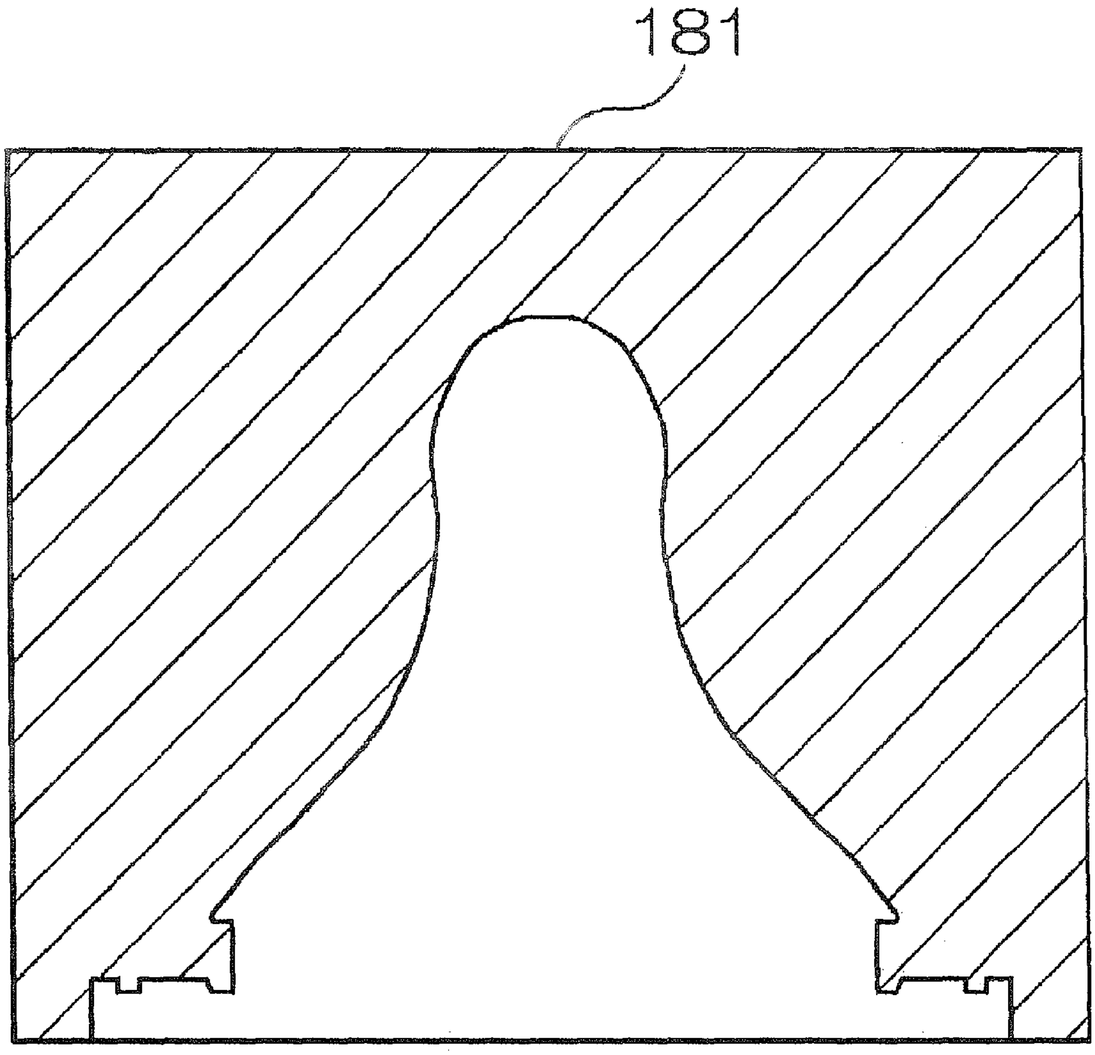
FIG. 4 is a schematic explanatory view showing another mold for molding an artificial nipple in accordance with principles of the invention.

FIG. 3 and FIG. 4 are schematic explanatory views showing molds or the like for molding the artificial nipple 100.

For molding the artificial nipple 100, as shown in FIG. 3, a shape holding layer shaping female mold 180 and a shaping male mold 190 are used, for example, as the shape holding layer shaping molds for shaping the shape holding layer 150 of FIG. 2.

At first, the shaping male mold 190 is inserted into the shape holding layer shaping female mold 180 shown in FIG. 3. After this, the aforementioned silicone rubber that has a hardness of 15 to 50 degrees is injected and molded (as one example of a first molding step). Then, the shape holding layer 150 shown in FIG. 2 is formed.

The shaping male mold 190 having a shaped shape holding layer 150 is inserted into a deformation absorbing layer shaping female mold 181 or the deformation absorbing layer shaping mold, as shown in FIG. 4, to such an extent that the mammary papilla leading end portion comes into abutment. The aforementioned silicone rubber of the hardness of 5 to 10 degrees is injected and molded (as one example of a second molding step). Then, the deformation absorbing layer 170 shown in FIG. 2 is molded integrally with the shape holding layer 150.

The shaping male mold 190 having the shape holding layer 150 and the deformation absorbing layer 170 integrally molded therein is then inserted into a tongue abutting layer shaping female mold which is given the same contour shape as that of the mammary papilla portion 130 or the like in the artificial nipple 100. The aforementioned silicone rubber having the hardness of 15 to 50 degrees is then injected therein and molded (as one example of a third molding step). Then, the tongue abutting layer 160 shown in FIG. 2 is molded integrally with the deformation absorbing layer 170.

Thus, the artificial nipple 100 having the three-layered structure is formed, as shown in FIG. 2. According to the manufacturing method of this embodiment, the deformation absorbing layer 170 of FIG. 2 can be reliably arranged between the shape holding layer 150 and the tongue abutting layer 160.

Here in this embodiment, the shape holding layer 150, the deformation absorbing layer 170 and the tongue abutting layer 160 are molded in the recited order. However, the molding order should not be limited thereto, but the tongue abutting layer 160, the deformation absorbing layer 170 and the shape holding layer 150 may also be molded in the recited order.

Moreover, the integral molding of this embodiment can contain the so-called "two-color molding", in which one male mold is sequentially moved to the different female molds, or by insert molding, in which the primary molding is set in another mold and integrally molded. Moreover, the molding method should not be limited to that of the embodiment but can contain the molding of dipping the tongue abutting layer 160 to become the outer layer of the secondary molding obtained till the second molding step, and can also include compression molding.

Other manufacturing methods of an artificial nipple are possible and examples of which are described below.

The aforementioned manufacturing method of the artificial nipple 100 has been described regarding the manufacturing method using the injection molding. By contrast, an embodiment of a molding method using a compression molding is described below.

At first, a tongue abutting layer shaping female mold is prepared. This tongue abutting layer shaping female mold is constituted to have a shape that is similar to that of the deformation absorbing layer shaping female mold 181 of FIG. 4. However, the shape of the inner side of the tongue abutting layer shaping female mold matches the contour of the tongue abutting layer 160 of FIG. 2.

A liquid elastomer for a tongue abutting layer which has a high hardness, such as the silicone rubber having the hardness of 15 to 50 degrees, is injected into the tongue abutting layer shaping female mold. In this state, the tongue abutting layer shaping male mold is inserted into the tongue abutting layer shaping female mold so that the tongue abutting layer 160 is compression-molded (as one example of the tongue abutting layer shaping step).

This tongue abutting layer shaping male mold has a constitution similar to that of the shaping male mold 190 of FIG. 3, and its contour matches the shape of the inner side of the tongue abutting layer 160 of FIG. 2.

As a result, the tongue abutting layer 160 shown in FIG. 2 is molded by inserting the tongue abutting layer shaping male mold and by compression molding it.

Next, while the tongue abutting layer 160 is being shaped in the tongue abutting layer shaping female mold, this tongue abutting layer shaping male mold is extracted. After this, the deformation absorbing layer liquid elastomer having a low hardness, such as a silicone rubber having the hardness of 5 to 10 degrees, is inserted on the tongue abutting layer 160.

After this, the deformation absorbing layer shaping male mold is inserted into the tongue abutting layer shaping female mold, and a compression molding is performed to mold the deformation absorbing layer 170 shown in FIG. 2 (as one example of the deformation absorbing layer shaping step).

This deformation absorbing layer shaping male mold has a constitution similar to that of the shaping male mold 190 of FIG. 3, and its contour matches the shape of the inner side of the deformation absorbing layer 170 of FIG. 2.

As a result, the deformation absorbing layer 170 shown in FIG. 2 is integrally molded on the tongue abutting layer 160 by inserting the deformation absorbing layer shaping male mold and by compression molding it.

Next, while the tongue abutting layer 160 and the deformation absorbing layer 170 are being shaped in the tongue abutting layer shaping female mold, this deformation absorbing layer shaping male mold is extracted. After this, the liquid elastomer for the shape holding layer having a high hardness such as the silicone rubber having the hardness of 15 to 50 degrees is inserted onto the deformation absorbing layer 170.

After this, the shape holding layer shaping male mold is inserted into the tongue abutting layer shaping female mold, and a compression molding is performed to mold the shape holding layer 150 shown in FIG. 2 (as one example of the shape holding layer shaping step).

This shape holding layer shaping male mold has a constitution similar to that of the shaping male mold 190 of FIG. 3, and a substantially identical constitution.

The shape holding layer 150 shown in FIG. 2 is molded integrally with the tongue abutting layer 160 and the deformation absorbing layer 170 by inserting the shape holding layer shaping male mold and by compression molding it.

If the deformation absorbing layer 170 having a lower rigidity (or a lower hardness) is to be injection-molded between the tongue abutting layer 160 and the shape holding layer 150 of FIG. 2 having a higher rigidity (or a higher hardness), the injected resin may be offset on the mold or influenced by the injection pressure which may raise a problem in that the homogeneous layer is hard to form.

According to the aforementioned method of laminating the individual layers by using the liquid elastic material to inject the individual layers sequentially from the outer side into one female mold, however, the deformation absorbing layer of the lower rigidity is integrally molded on the tongue abutting layer 160 by the compression molding. As a result, the soft resin of the lower hardness is not offset on one side of the mold so that the homogeneous layers can be easily molded.

According to that method, moreover, the artificial nipple 100 is molded sequentially from the tongue abutting layer 160 or the outer side of FIG. 2. This makes it sufficient to prepare only the tongue abutting layer shaping female mold, and makes it unnecessary to prepare the female mold for the shape holding layer 150 or the like. As a result, it is possible to lower the manufacturing cost for the artificial nipple 100. Here in this manufacturing method using the compression molding, too, the artificial nipple 100 need not be manufactured from the outer side tongue abutting layer 160 by using one female mold. By using one male mold, the artificial nipple 100 could also be manufactured by molding the inner side shape holding layer 150 and by changing the female molds.

Here, the method for manufacturing the artificial nipple 100 according to the aforementioned compression molding can be applied to not only this embodiment but also other embodiments to be described hereinafter.

Figure 5:
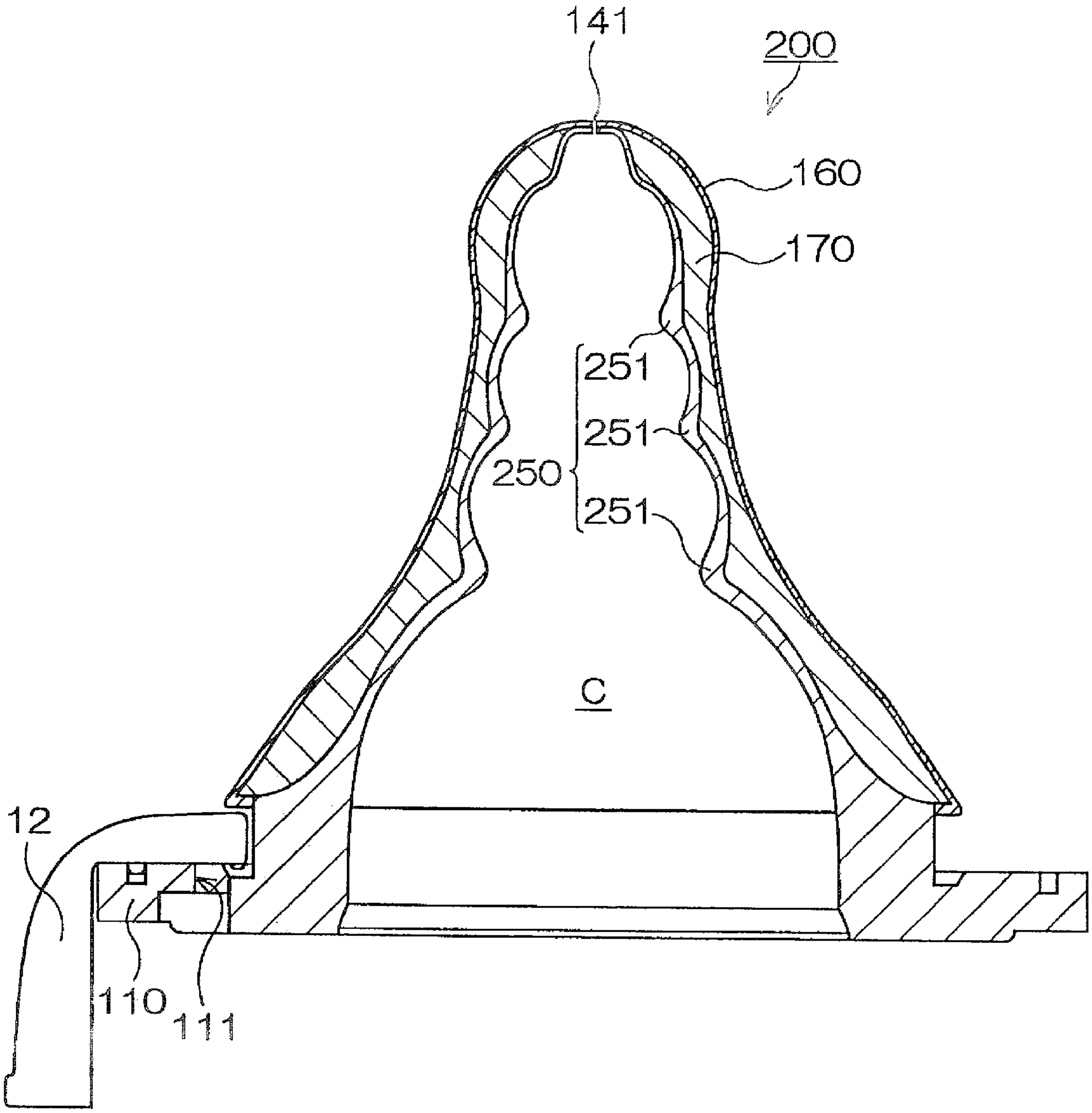
FIG. 5 is a schematic section showing an artificial nipple according to another embodiment of the invention.

FIG. 5 is a schematic section showing an artificial nipple 200 according to another embodiment of the invention. The constitution of the artificial nipple 200 shown in FIG. 5 is mostly common to that of the artificial nipple 100 according to the first mode of embodiment. Therefore, a description of the common portions is omitted from this description and similar portions are designated by common reference numerals, and the following description is centralized on the different points.

In this embodiment, a shape holding layer 250 shown in FIG. 5 is different from that of the embodiment of FIG. 2. Specifically, the shape holding layer 250 of this embodiment is provided, as shown in FIG. 5, with three protrusions 251 or rigid portions protruding away from the shape holding layer 250 so that the thickness of the deformation absorbing layer 170 is accordingly provided with thick portions and thin portions.

Specifically, the protrusions 251 are formed in ring shapes protruding from the shape holding layer 250 to the side of the hollow portion C. Here, these protrusions 251 may also be shaped into a spiral shape or continuous dots. Alternatively, what is increased in thickness is not the shape holding layer 250 but only the deformation absorbing layer 170, so that the rigidity may be enhanced by corrugating the shape holding layer 250 while leaving it with a homogeneous thickness.

Thus in this embodiment, the protrusions 251 having the rigidity enhance the shape holding layer 250. As a result, the rigidity of the shape holding layer 250 is enhanced within the range of not preventing the tongue peristalsis motion so that the wall of the artificial nipple 200 can be reliably prevented from being crushed by the tongue peristalsis motion of the infant or the like.

Figure 6:
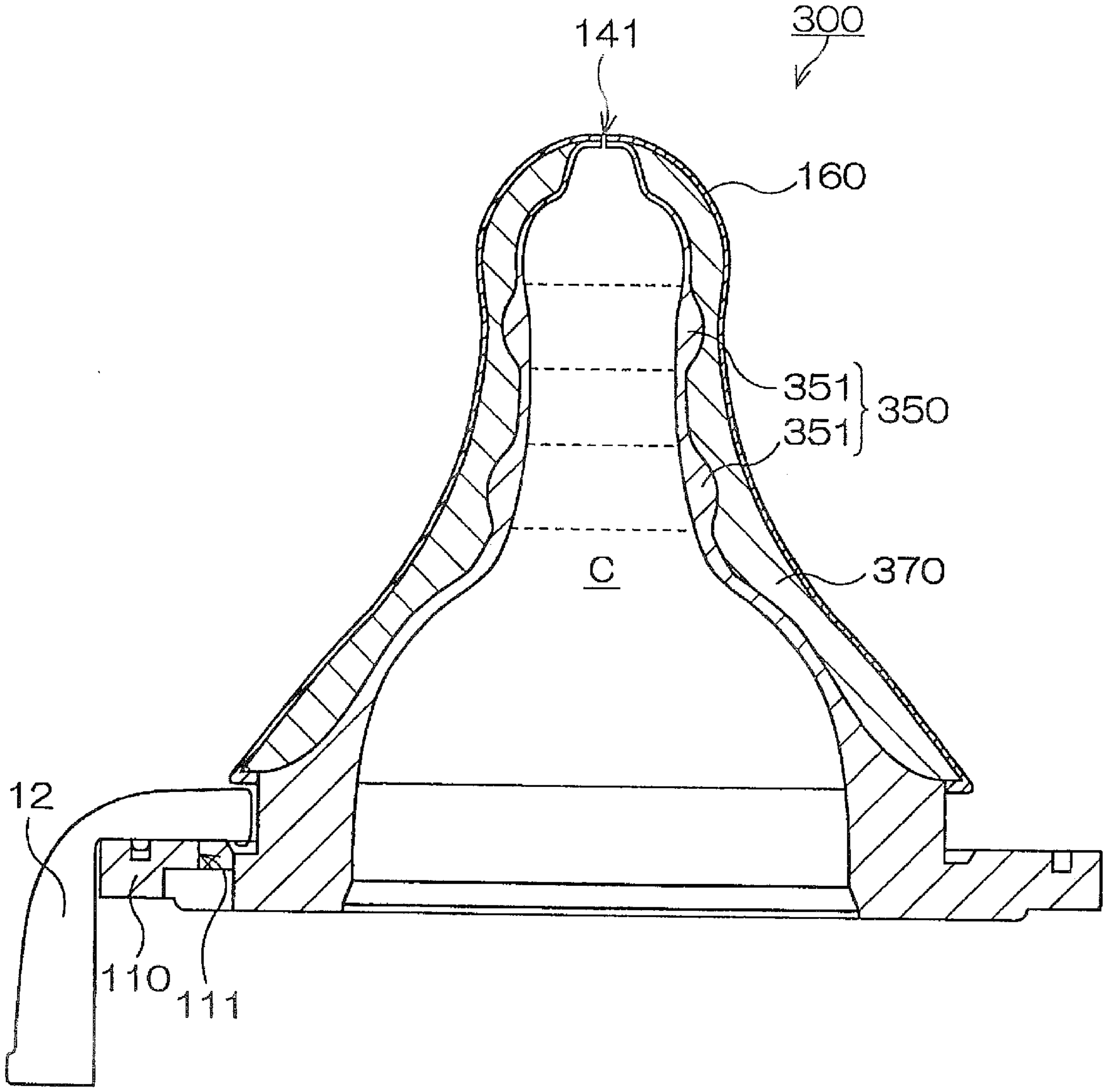
FIG. 6 is a schematic section showing an artificial nipple according to yet another embodiment of the invention.

FIG. 6 is a schematic section showing an artificial nipple 300 according to another embodiment of the invention. The constitution of the artificial nipple 300 shown in FIG. 6 is mostly common to that of the artificial nipple 100 according to the embodiment of FIG. 2. Therefore, a description of the common portions is omitted and similar portions are designated by common reference numerals. The following description is centralized on the different points.

In this embodiment, a shape holding layer 350 and a deformation absorbing layer 370, as shown in FIG. 6, are different from those of the embodiment of FIG. 2. In this embodiment, more specifically, the shape holding layer 350 is so arranged that protrusions 351 protruding to the side of the deformation absorbing layer 370 abut against the deformation absorbing layer 370. These protrusions 351 are arranged at two portions, for example, in ring shapes, as shown in FIG. 6.

Moreover, the deformation absorbing layer 370 is so constituted as is recessed, as shown in FIG. 6, at portions corresponding to the protrusions 351 of the shape holding layer 350.

By thus protruding the protrusions 351 of the shape holding layer 350 to the side of the deformation absorbing layer 370, the constitution is made such that effects similar to the protrusions 251 of the embodiment of FIG. 5 can be attained, and such that the protrusions 351 are not formed on the shape holding layer 350 on the side of the hollow portion C. When the hollow portion C of the artificial nipple 300 of FIG. 6 is rinsed by the user, the artificial nipple 300 is easy to rinse because there are no protrusion, which might otherwise obstruct the rinsing operation.

Here in this embodiment, the protrusions 351 are formed on the shape holding layer 350. However, the protrusions 351 should not be limited thereto but may be formed on the tongue abutting layer 160. In this modification, the protrusions are formed from the tongue abutting layer 160 to the side of the deformation absorbing layer 370.

FIG. 7(*a*) is a schematic section showing an artificial nipple 400 according to yet another embodiment of the invention, and FIG. 7(*b*) is a schematic section along line D-D of FIG. 7(*a*).

The constitution of the artificial nipple 400 according to this embodiment is mostly common to that of the artificial nipple 100 according to the embodiment of FIG. 2. Therefore, a description of common portions is omitted and similar portions are designated by common reference numerals. The following description is centralized on the different points.

In this embodiment, as shown in FIG. 7(*a*), a shape holding layer 450 is provided near the mammary papilla, with rigid ribs 451, which extend in the direction of the tongue peristalsis motion. These rigid ribs 451 are arranged to reach the tongue abutting layer 160. In other words, a deformation absorbing layer 470 is not arranged at the portions where the rigid ribs 451 are formed, but is directly joined to the tongue abutting layer 160.

At the portions where the rigid ribs 451 are formed, therefore, the soft silicone rubber of low hardness does not exist, but only a high hardness and a rigid silicone rubber is arranged. This arrangement provides an artificial nipple 400 in which it is hard to crush by the tongue peristalsis motion of the infant or the like.

At the portions where the rigid ribs 451 are formed, moreover, the tongue abutting layer 160 having the relatively high rigidity and the shape holding layer 450 are directly integrated with each other, thereby providing a constitution having little distortion between the layers.

The artificial nipple 400 can be used such that during use the tongue of the infant or the like abuts against, as shown on the right side of FIG. 7(*a*), the side of an opposed face T opposite one of the three rigid ribs 451.

Moreover, the artificial nipple 400 is provided, as shown in FIGS. 7(*a*) and 7(*b*), with none of the rigid ribs 451 on the opposed face T, against which the tongue of the infant or the like abuts. At the portion, against which the infant tongue abuts, therefore, the deformation absorbing layer 470 is formed on the inner side of the tongue abutting layer 160, so that the wall of the artificial nipple 400 is smoothly deformed by the bulge of the infant tongue.

Thus, the artificial nipple 400 is provided with the rigid ribs 451 only at the portions against which the infant tongue does not abut, but not at the portions against which the infant tongue abuts. Thus, it is possible to realize the artificial nipple 400 which is easy for the infant or the like to perform the tongue peristalsis motion but which is difficult to crush on the wall by the tongue peristalsis motion.

Moreover, the artificial nipple 400 of this embodiment has no protrusion formed on the side of the hollow portion C so that a user can wash it easily.

Here in this embodiment, the rigid ribs 451 of the shape holding layer 450 are longitudinally arranged, but should not be limited thereto. Column-shaped rigid ribs may also be arranged obliquely in dotted lines in the drawing.

Figure 8:
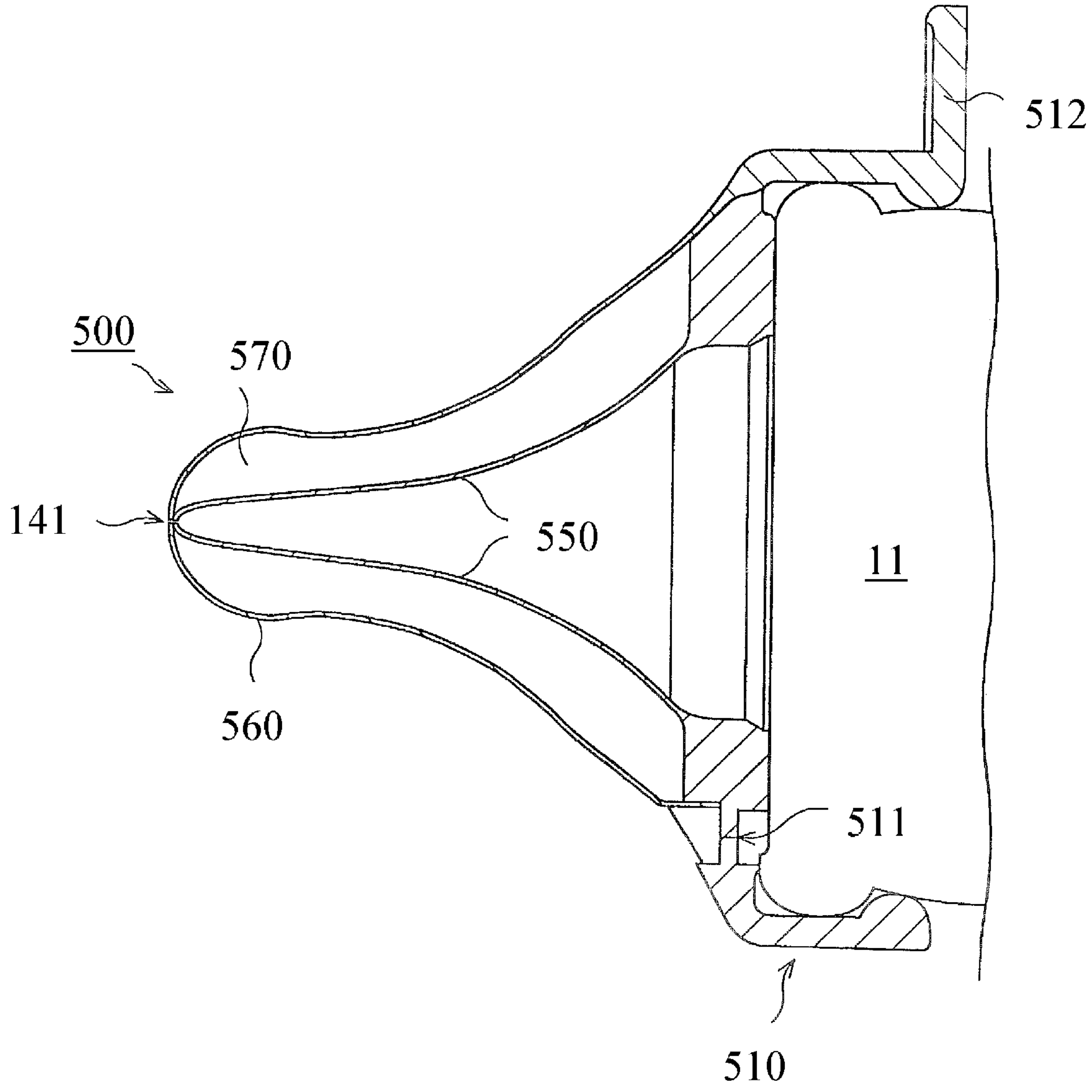
FIG. 8 is a schematic section showing an artificial nipple according to another embodiment of the invention.

FIG. 8 is a schematic section showing an artificial nipple 500 according to another embodiment of the invention. The constitution of the artificial nipple 500 according to this embodiment is mostly common to that of the artificial nipple 100 according to the embodiment of FIG. 2. Therefore, a description of common portions is omitted and similar portions are designated by common reference numerals. The following description is centralized on the different points.

A deformation absorbing layer 570 of the artificial nipple 500 of this embodiment is made thicker than the deformation absorbing layer 170 of the artificial nipple 100 of the embodiment of FIG. 2. The deformation absorbing layer 170 is made of a silicone rubber or the like having a hardness of 10 or less, as described hereinbefore. In case the thickness is increased, therefore, the wall of the artificial nipple 500 is easily deformed when the infant or the like performs the tongue peristalsis motion, so that the artificial nipple 500 comes closer to the feel of the nipple of an actual mother or the like.

A shape holding layer 550 is made thinner than the shape holding layer 150 of the artificial nipple 100 of the embodiment of FIG. 2 and substantially equal to that of a tongue abutting layer 560.

In this embodiment, more specifically, the deformation absorbing layer 570 is made so thick that the deformation of the wall of the artificial nipple 500 by the tongue peristalsis motion of the infant or the like is sufficiently absorbed by the deformation absorbing layer 570. Even if the shape holding layer 150 is thinned, therefore, the deformation absorbing layer 570 can prevent the wall of the artificial nipple 500 from being crushed.

As the deformation absorbing layer 570 is made thick, moreover, the space in the hollow portion C is relatively narrowed. As a result, the artificial nipple 500 is prevented from being entirely deformed by the tongue peristalsis motion of the infant, so that the prepared milk or the like is prevented from being squeezed out from the leading end opening 141 by the pressure accompanying that deformation. Thus, the deformation is reliably absorbed by the deformation absorbing layer 570 so that a proper quantity flows out according to the peristalsis motion. Here, the hollow portion C may be formed into a tubular passage.

The artificial nipple 500 of this embodiment can be formed differently from the artificial nipple 100 of the embodiment of FIG. 2 so as not to require the cap 12 when it is mounted on the infant feeding bottle 11. Specifically, the artificial nipple 500 is provided with a base cap portion 510, as shown in FIG. 8.

As shown in FIG. 8, the tongue abutting layer 560 and the shape holding layer 550, which are made of silicone rubber are stretched to form the base cap potion 510. This tongue abutting layer 560 and so on are made of the relatively rigid silicone rubber having the hardness of 15 to 50 degrees, so that the base cap portion 510 is made to have a high rigidity.

As a result, the base cap portion 510 enables the artificial nipple 500 to be so mounted on the infant feeding bottle 11 that it may not easily come out.

The base cap portion 510 is provided, as shown in FIG. 8, with a tongue part 512 for removing the base cap portion 510 easily from the infant feeding bottle 11. As a result, the user can remove the artificial nipple 500 easily from the infant feeding bottle 11 by operating the tongue part 512 manually.

The present invention is not limited to the individual embodiments thus far described. These embodiments are exemplified by equalizing the hardness of the tongue abutting layer 160 and the shape holding layer 150. As the material to be used for the shape holding layer 150, however, a material having a relatively high hardness may be adopted to reliably prevent a crushing effect, thereby reducing the thickness. On the other hand, the constitution of the nipple may be such that it does not obstruct the peristalsis motion and also prevents the crushing effect by setting the hardness of the tongue abutting layer 160 lower than that of the shape holding layer 150 and close to that of the deformation absorbing layer 170 such that the hardness may fall within the range, in which the viscosity of the surface does not become high.

Moreover, the artificial nipple 100 is so formed in advance that the mother's nipple or mammary papilla may be deformed in the infant's oral cavity and that the deformed artificial nipple may include the aforementioned individual layers of the tongue abutting layer, the shape holding layer and the deformation absorbing layer.

Moreover, the aforementioned individual embodiments may be constituted in combination.

DESCRIPTION OF REFERENCE NUMERALS AND SIGNS

10—Infant Feeding Device, 11—Infant Feeding Bottle, 100—Artificial Nipple, 120—Nipple Body Portion, 130—Mammary Papilla Portion, 140—Leading End Portion of Mammary Papilla, 141—Leading End Opening, 150—Shape Holding Layer, 160—Tongue Abutting Layer, and 170—Deformation Absorbing Layer.

The invention claimed is:

1. An infant feeding device including an artificial nipple comprising:

a mounting portion configured to connect the artificial nipple to a feeding bottle;

a nipple body portion located adjacent said mounting portion;

a mammary papilla portion protruding from said nipple body portion; and a mammary papilla leading end portion positioned at a leading end portion of said mammary papilla portion and having a leading end opening formed therein and configured for passing a liquid therethrough, wherein a wall of the artificial nipple located from said nipple body portion to said mammary papilla leading end portion is made of a soft material, a shape holding layer made of a material having a predefined rigidity so as to hold the shape of said wall is formed as an inner layer and located at an inner side of said wall, a tongue abutting layer having a smooth face allowing a peristalsis motion by a tongue is formed as an outer layer and located at an outer side of said wall, said shape holding layer is thicker than said tongue abutting layer, said mounting portion is made from a first material having a first hardness, and said shape holding layer is made from the first material having the first hardness, a deformation absorbing layer is made of a material having a rigidity that is lower than the predefined rigidity of the material of said shape holding layer and that is lower than a rigidity of said tongue abutting layer, the deformation absorbing layer having a thickness that is larger than a thickness of said shape holding layer and said tongue abutting layer, and said deformation absorbing layer being arranged between said shape holding layer and said tongue abutting layer.

2. An artificial nipple comprising:

a mounting portion configured to connect the artificial nipple to a feeding bottle;

a nipple body portion located adjacent said mounting portion;

a mammary papilla portion protruding from said nipple body portion; and a mammary papilla leading end portion positioned at a leading end portion of said mammary papilla portion and having a leading end opening formed therein and configured for passing a liquid therethrough, wherein a wall of the artificial nipple located from said nipple body portion to said mammary papilla leading end portion is made of a soft material, a shape holding layer made of a material having a predefined rigidity so as to hold the shape of said wall is formed as an inner layer and located at an inner side of said wall, a tongue abutting layer having a smooth face allowing a peristalsis motion by a tongue is formed as an outer layer and located at an outer side of said wall, said shape holding layer is thicker than said tongue abutting layer, said mounting portion is made from a first material having a first hardness, and said shape holding layer is made from the first material having the first hardness, a deformation absorbing layer is made of a material having a rigidity that is lower than the predefined rigidity of the material of said shape holding layer and that is lower than a rigidity of said tongue abutting layer, the deformation absorbing layer having a thickness that is larger than a thickness of said shape holding layer and said tongue abutting layer, and said deformation absorbing layer being arranged between said shape holding layer and said tongue abutting layer.

3. An artificial nipple as set forth in claim 1, wherein the mammary papilla leading end portion having said leading end opening formed therein is formed of at least one of said shape holding layer and said tongue abutting layer.

4. An artificial nipple as set forth in claim 3, wherein a portion of said shape holding layer located adjacent said mammary papilla leading end portion is thinner than another portion of said shape holding layer located adjacent one of said mammary papilla portion and said nipple body portion.

5. An artificial nipple as set forth in claim 3, wherein said shape holding layer has a rigid portion protruding in a direction to leave said shape holding layer.

6. An artificial nipple as set forth in claim 3, wherein said tongue abutting layer and said shape holding layer are made of an elastic member having a hardness of 15 to 50 degrees according to an A-type duro-meter, and said deformation absorbing layer is made of an elastic member having a hardness of 10 degrees or less, according to an A-type duro-meter.

7. An artificial nipple as set forth in claim 1, wherein a portion of said shape holding layer located adjacent said mammary papilla leading end portion is thinner than another portion of said shape holding layer located adjacent one of said mammary papilla portion and said nipple body portion.

8. An artificial nipple as set forth in claim 7, wherein said shape holding layer has a rigid portion protruding in a direction to leave said shape holding layer.

9. An artificial nipple as set forth in claim 7, wherein said tongue abutting layer and said shape holding layer are made of an elastic member having a hardness of 15 to 50 degrees according to an A-type duro-meter, and said deformation absorbing layer is made of an elastic member having a hardness of 10 degrees or less, according to an A-type duro-meter.

10. An artificial nipple as set forth in claim 1, wherein said shape holding layer has a rigid portion protruding in a direction to leave said shape holding layer.

11. An artificial nipple as set forth in claim 10, wherein said tongue abutting layer and said shape holding layer are made of an elastic member having a hardness of 15 to 50 degrees according to an A-type duro-meter, and said deformation absorbing layer is made of an elastic member having a hardness of 10 degrees or less, according to an A-type duro-meter.

12. An artificial nipple as set forth in claim 1, wherein said tongue abutting layer and said shape holding layer are made of an elastic member having a hardness of 15 to 50 degrees according to an A-type duro-meter, and said deformation absorbing layer is made of an elastic member having a hardness of 10 degrees or less, according to an A-type duro-meter.

13. An artificial nipple as set forth in claim 1, wherein the feeding bottle is an infant feeding bottle.

14. A method for manufacturing an artificial nipple that includes a mounting portion configured to connect the artificial nipple to a feeding bottle, a nipple body portion connected to said mounting portion, a mammary papilla portion protruding from said nipple body portion, and a mammary papilla leading end portion positioned at a leading end portion of said mammary papilla portion and having a leading end opening formed therein and configured for passing a liquid therethrough, wherein, a wall of the artificial nipple located from said nipple body portion to said mammary papilla leading end portion is made of a soft material, a shape holding layer made of a material having a predefined rigidity to hold the shape of said wall is formed as an inner layer and located at an inner side of said wall, a tongue abutting layer having a smooth face which allows a peristalsis motion by a tongue is formed as an outer layer and located at an outer side of said wall, said shape holding layer is thicker than said tongue abutting layer, said mounting portion is made from a first material having a first hardness, and said shape holding layer is made from the first material having the first hardness, a deformation absorbing layer is made of a material having a rigidity that is lower than the predefined rigidity of the material of said shape holding layer and that is lower than a rigidity of said tongue abutting layer, the deformation absorbing layer having a thickness that is larger than a thickness of said shape holding layer and said tongue abutting layer, and said deformation absorbing layer being arranged between said shape holding layer and said tongue abutting layer, the method comprising:

injecting an elastic material into at least one of, a shape holding layer shaping mold to shape said shape holding layer, and a tongue abutting layer shaping mold to shape said tongue abutting layer, thereby forming at least one of said shape holding layer and said tongue abutting layer;

injecting an elastic material, while at least one of said shape holding layer and said tongue abutting layer is mounted in a deformation absorbing layer shaping mold to shape said deformation absorbing layer, thereby molding said deformation absorbing layer such that the deformation absorbing layer is integrated with at least one of said shape holding layer and said tongue abutting layer; and integrally molding at least one of said shape holding layer and said tongue abutting layer that was not previously formed, with said deformation absorbing layer.

15. A method for manufacturing an artificial nipple that includes a mounting portion that is configured to connect the artificial nipple to a feeding bottle, a nipple body portion located adjacent said mounting portion, a mammary papilla portion protruding from said nipple body portion, and a mammary papilla leading end portion positioned at a leading end portion of said mammary papilla portion and having a leading end opening configured for passing liquid therethrough, wherein a wall of the artificial nipple located from said nipple body portion to said mammary papilla leading end portion is made of a soft material, a shape holding layer made of a material having a predefined rigidity so as to hold the shape of said wall is formed as an inner layer and located at an inner side of said wall, a tongue abutting layer having a smooth face which allows a peristalsis motion by a tongue is formed as an outer layer and located at an outer side of said wall, said shape holding layer is thicker than said tongue abutting layer, said mounting portion is made from a first material having a first hardness, and said shape holding layer is made from the first material having the first hardness, a deformation absorbing layer is made of a material having a rigidity that is lower than a rigidity of the shape holding layer, and the tongue abutting layer, the deformation absorbing layer being arranged between said shape holding layer and said tongue abutting layer, the method comprising:

providing a tongue abutting layer shaping female mold and a tongue abutting layer shaping male mold;

filling the tongue abutting layer shaping female mold with a liquid elastomer so as to provide the tongue abutting layer with a high hardness;

subsequently inserting the tongue abutting layer shaping male mold into said tongue abutting layer shaping female mold, thereby compression molding said tongue abutting layer;

filling said tongue abutting layer that is compression molded with a liquid elastomer to form the deformation absorbing layer having a low hardness;

subsequently inserting a deformation absorbing layer shaping male mold, thereby compression molding said deformation absorbing layer;

filling the deformation absorbing layer that is compression molded with a liquid elastomer to form the shape holding layer having a high hardness; and subsequently inserting a shape holding layer shaping male mold, thereby compression molding said shape holding layer.

* * * * *